United States Patent Office 3,332,595
Patented July 25, 1967

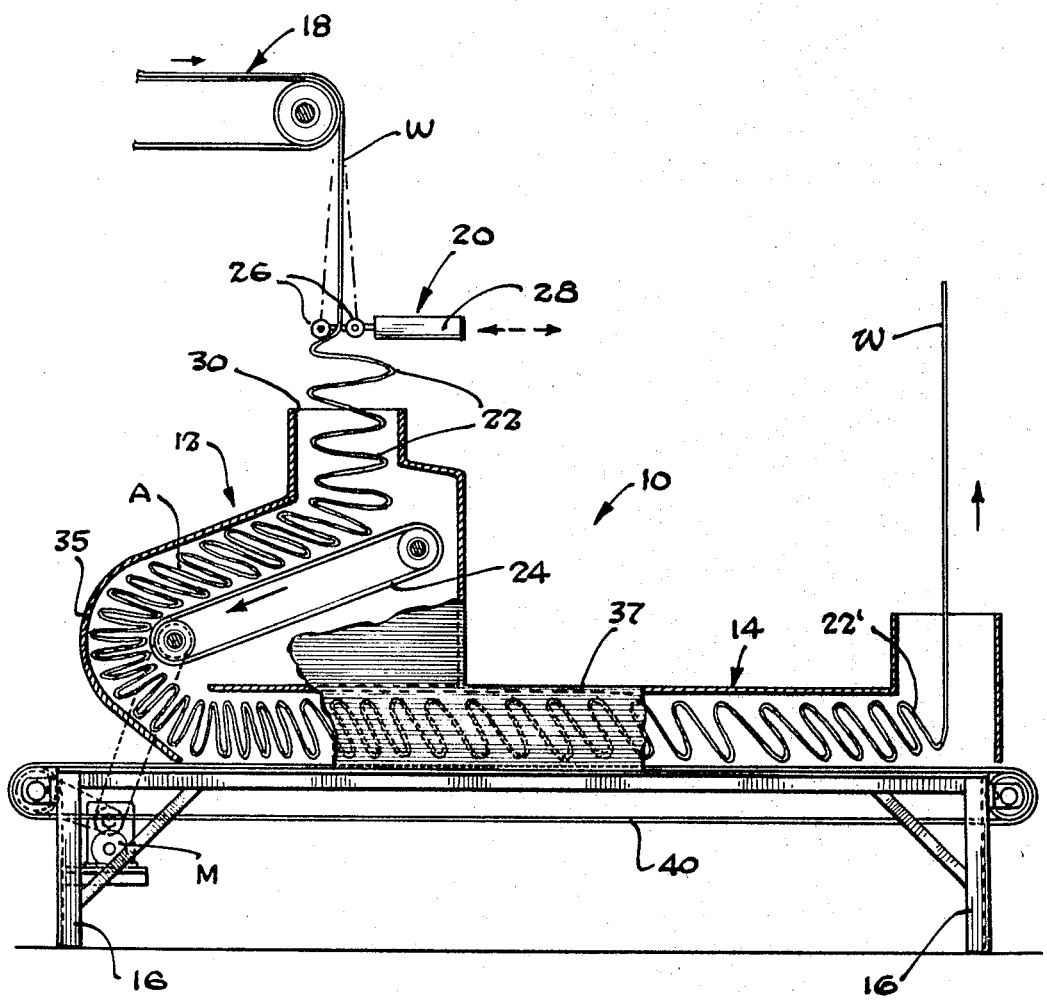

3,332,595
TEMPORARY STORAGE APPARATUS FOR CONTINUOUS WEBBING AND THE LIKE
Justin J. Wetzler, Evanston, Ill., assignor to F. W. Means & Co., Chicago, Ill., a corporation of Illinois
Filed June 10, 1965, Ser. No. 462,968
5 Claims. (Cl. 226—119)

The present invention relates to a storage apparatus and more particularly it relates to a storage apparatus for a processing line involving the handling of a continuous web of material where temporary storage of limited quantities of material is desired.

In processing continuous webbing, or in any other process involving handling of continuous lengths of materials, often it is desirable to provide lead time for set up of any stage or sequence in the continuous processing line. This lead time is necessary to accommodate a break-down or temporary stoppage in a stage of the processing or for any other reason including adjustment of the apparatus, or the like. If a lead time is not provided between stages then the entire line must be interrupted at any time that one stage in the line is interrupted resulting in a decrease in operating efficiency.

The apparatus of the present invention contemplates the provision of means to accommodate interruptions in a preceding or subsequent stage in the operation without interruption of the entire processing line or without interruption of the preceding or subsequent stage in the line. The apparatus is particularly intended for processing lines involving the handling of pliable webbing, or the like, such as toweling used in continuous towel discharge cabinets.

The novel features which are believed to be characteristic of the invention are set forth with particularity in the appended claims. The invention itself, however, together with further objects and advantages thereof, will best be understood by reference to the following description taken in connection with the accompanying drawing, in which:

FIGURE 1 is a side elevation, partly in section of the apparatus of the present invention illustrating the first and second storage and transport means and schematically representing the operation of the apparatus when used with a pliable continuous web in a line continuously processing the webbing.

Referring more particularly now to the drawing the apparatus is indicated generally at 10 and includes a first storage section 12 and a second storage section 14.

A support bed 16 is provided for support of the storage apparatus and to define a bed over which the moveable surface of the second storage section is supported and may move.

The apparatus of the present invention is especially useful where pliable webbing (or towelling as suggested above) is being conditioned in a continuous process. The storage apparatus will be interposed between two stages of the process and serves to store a limited quantity of the webbing during processing. If the first stage of the processing line is temporarily disabled for any reason the second stage (or later stage if there are many) will continue to operate and will draw webbing from the limited quantity stored in the apparatus 10.

A pliable material, such as toweling used in continuous towel discharge cabinets, may not simply be conveyed in folds along a chute or conveyor and withdrawn at the other end. A continuous strand of this type, of course, would not provide surplus materials between the two stages of the process nor would it provide surplus materials between the two stages of the process nor would it provide facilities for storage of the webbing in usable form by the next stage. It can readily be seen, of course, that if the later stage is stopped temporarily materials may continually be discharged from the earlier stage and fed to a storage area where it is accumulated in folded form (or other form) until the later processing stage is again ready to accept material. However, the form of storage is important in that web tangles, folds, creases, or the like must be avoided. If the material is stored in a random manner the later stage of processing probably could not use the stored webbing until it had been conditioned in some manner by untangling and straightening it out to avoid folding or creasing of the webbing.

Thus, a patterned storage should be provided so that the webbing may be withdrawn in the order in which it was stored and without tangles, or the like.

Another aspect of storage is that if the material is directly conveyed in successive folds along a chute, or other means, the folds will each project forward and the weight thereof will be on the preceding fold. The accumlated weight on a fold is significant. When a fold is to be withdrawn the interengagement of fabric between adjacent folds will result in a condition whereby more than one fold will tumble from the apparatus and the same condition exists as with random storage only in a lesser degree. I avoid this condition entirely with the storage apparatus of the present invention. This condition is exaggerated, of course, if the webbing being handled is still wet from the preceding stage of processing, such as webbing still wet from the washing stage.

As seen in the drawings, the webbing W is transported from the preceding processing stage along a continuously moving belt 18. The webbing W then is fed into and through a festooning device 20 to orient the material into folds as seen as 22. It should be observed, however, that the webbing may be disposed directly onto the receiving end of the belt 24 without passage through the festooning device 20. The material will fold although perhaps not in as regular a fashion as is achieved by use of the device 20. The festooning device 20 is defined by a guide means 26 between which the web W passes and means 28 to move the guide means 26 reciprocally in a direction normal to the movement of the webbing W thereby causing the webbing to assume the pattern of movement of the guides and to be oriented in successive folds as shown at 22.

The folds of webbing then enter the receiving portion of the apparatus through an opening 30 and are deposited upon the entry portion of the continuously moving belt 24. The belt 24 moves such that the upper belt travel will be from right to left as viewed in FIGURE 1. The successive folds are carried along by the moving belt at a rate of movement sufficient to define free deposit space on the belt for the belt contact area of each successive fold of webbing. As the folds 22 are deposited on the belt 24 they collapse over onto the preceding fold as indicated generally at A in FIGURE 1. If the folds were withdrawn in a single strand at the end of the belt 24 it is likely that each fold would carry successive folds with it and result in tumbling of more material at intervals that the succeeding operation can use. The webbing W would be spilled over the discharge end of the belt in random fashion and difficulty may be encountered in properly orienting the material prior to entry into the next stage. To avoid this problem I have discovered that re-transfer of the successive folds to a second traveling surface and in a particular manner will cause a reversal of the folds and will orient them such that the weight of each fold is transferred to the succeeding fold and withdrawal of a single strand will be facilitated at any point along the second moving surface. Since each of the successive folds is not resting or otherwise engaging a preceding fold or the fold of webbing being withdrawn there is no tendency for webbing W or folds to move other than that material being withdrawn for use in the succeeding processing stage and at the rate of withdrawal required for said stage.

The transport area of the storage apparatus is enclosed by a first wall 35 extending over the first belt and the transfer area as seen in FIGURE 1 and a second wall 37 extending along and over the surface of the second moving belt 40. The curved portion of the wall 35 guides the folds 22 from the belt 24 toward and onto the belt 40 to define the transfer from the first to the second belt, respectively. As the folds slide down the curved wall portion of wall 35 the bottom of each successive fold is moved onto the belt 40 which is moving in a direction such that the upper belt area is moving from left to right in FIGURE 1. As the bottom of each successive fold engages the belt 40 it is carried along thereby while the upper fold portion lags slightly—it being freely supported by successive folds. The top portion of each fold will collapse rearwardly (in FIGURE 1) and the folds then will be oriented such that the weight and contact of each fold will be on the succeeding fold rather than on the forward fold as on the belt 24. In this manner the outermost fold 22' on the belt 40 is free and there are no restraints on its withdrawal from the belt 40. Also, there is no tendency for other folds to tumble from the apparatus nor is there any weight on the fold 22' to give rise to difficulty in withdrawing or extracting the material of the fold 22' from the belt 40.

The belts 24 and 40 are continuously moved at substantially the same rate so that movement of folds 22 within the apparatus will be uniform. Both belts 24 and 40, respectively, may be driven from a common power source M with drive belts or other suitable power linkage therebetween.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What I claim as new and desire to secure by Letters Patent of the United States, is:

1. A storage apparatus for a processing line involving handling of a continuous web of material where temporary storage of limited quantities of material is desired, said apparatus having a web receiving area and comprising:
    first storage means mounted in the web receiving area of the storage apparatus and having receiving and discharge ends;
    a continuously moving belt operatively associated with said first storage means and defining a continuous path between the receiving and discharge ends thereof, said webbing moving along said processing line to the receiving end of the first storage means and being deposited upon the continuously moving belt in repeated folds, each fold of the webbing being carried along by the moving belt at a rate sufficient to define free deposit space for each successive fold of webbing said folds each collapsing upon the preceding fold during deposit upon the moving belt of the first storage means;
    second storage means having a receiving end and a discharge end with the receiving end thereof positioned below the discharge end of the first storage means to define a continuous path between the first and second storage means for transfer of the folded web material therebetween; and
    a moving surface operatively associated with said second storage means and defining a continuous path between the receiving and discharge ends thereof, the successive folds of webbing being transferred from the discharge end of the first storage means onto the moving surface of the second storage means, housing means cooperating with the discharge end of the first storage means and the receiving end of the second storage means to turn the folds over for delivery to said moving surface of said second storage means, the rate of movement of the moving surface being sufficient to define free deposit space for each successive fold of webbing transferred thereto, said folds being reversed during transfer from the first to the second storage means so that the weight of each fold primarily is upon the succeeding fold and withdrawal of webbing at the discharge end of the second storage means is facilitated.

2. A storage apparatus for a processing line involving handling of a continuous web of material where temporary storage of limited quantities of material is desired, said apparatus comprising:
    a first storage means having receiving and discharge ends, said webbing moving along said processing line onto the receiving end of the first storage means and being deposited thereon in folds, a moving surface to carry each web fold along said first storage means to said discharge end and to continually define space for additional webbing to be deposited thereon;
    a second storage means spaced below said first storage means, a receiving end of said second storage means positioned in the area of the discharge end of the first storage means; and
    constraining means spaced from the discharge end of the first storage means and the receiving end of the second storage means said webbing being turned over as it is transferred from the discharge end of the first storage means to the receiving end of said second storage means, and said webbing being carried along said second storage means to provide room for receipt of additional webbing, the turned over web folds being reversed so that the weight of each fold is primarily upon the succeeding fold.

3. A storage apparatus as in claim 1 which further includes a second moving surface on said second storage means to effect the transport of said webbing along said second storage means.

4. A storage apparatus as in claim 1 wherein said constraining means is a curved wall spaced laterally from the discharge end of the first storage means and the receiving end of the second storage means.

5. A storage apparatus as in claim 3 wherein the receiving end of the second storage means is spaced laterally and inwardly relative to the discharge end of the first storage means.

References Cited
UNITED STATES PATENTS

| | | | |
|---|---|---|---|
| 284,323 | 9/1883 | Palmer | 226—118 |
| 2,395,305 | 2/1946 | Vincent et al. | 226—118 |
| 3,203,607 | 8/1965 | Mason | 226—119 |

FOREIGN PATENTS

| | | |
|---|---|---|
| 236,896 | 11/1964 | Austria. |
| 567,151 | 5/1958 | Belgium. |
| 1,237,591 | 6/1960 | France. |
| 79,753 | 11/1955 | Netherlands. |

M. HENSON WOOD, Jr., *Primary Examiner.*

ALLEN N. KNOWLES, *Examiner.*